US011105527B2

(12) United States Patent
Wagner et al.

(10) Patent No.: US 11,105,527 B2
(45) Date of Patent: Aug. 31, 2021

(54) BUILDING EQUIPMENT CONTROLLER WITH USER-CONFIGUREABLE INPUTS AND OUTPUTS

(71) Applicant: Johnson Controls Technology Company, Auburn Hills, MI (US)

(72) Inventors: Aaron D. Wagner, Menomonee Falls, WI (US); Chaitra Shastry, Milwaukee, WI (US); Jameel Ahmed, Milwaukee, WI (US); Homero L. Noboa, Waukesha, WI (US); Camille M. Aucoin, Milwaukee, WI (US); Hunter R. Hobgood, Franklin, WI (US); Dinesh Trikha, Shorewood, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 117 days.

(21) Appl. No.: 16/235,316

(22) Filed: Dec. 28, 2018

(65) Prior Publication Data

US 2020/0208864 A1 Jul. 2, 2020

(51) Int. Cl.
*G05B 19/042* (2006.01)
*F24F 11/00* (2018.01)
*F24F 11/523* (2018.01)
*G06F 3/0484* (2013.01)

(52) U.S. Cl.
CPC .......... *F24F 11/523* (2018.01); *G05B 19/042* (2013.01); *G05B 2219/2614* (2013.01); *G06F 3/04847* (2013.01)

(58) Field of Classification Search
CPC .......................... G05B 19/042; G06F 3/04847
See application file for complete search history.

(56) References Cited

U.S. PATENT DOCUMENTS

| | | | |
|---|---|---|---|
| 5,039,009 A | 8/1991 | Baldwin et al. | |
| 5,276,630 A | 1/1994 | Baldwin et al. | |
| 9,626,335 B2 | 4/2017 | Muldowney et al. | |
| 2009/0088902 A1 | 4/2009 | Williams | |
| 2012/0154130 A1* | 6/2012 | Liu | H04N 21/4126 340/12.25 |

(Continued)

FOREIGN PATENT DOCUMENTS

CA 2326890 11/2001

*Primary Examiner* — Mark A Connolly
(74) *Attorney, Agent, or Firm* — Foley & Lardner LLP

(57) ABSTRACT

A controller includes a plurality of configurable input ports, a plurality of configurable output ports, and a configuration circuit. The configuration circuit is configured to provide a graphical user interface configured to facilitate a user in inputting an equipment description, determine a controller configuration based on the equipment description, configure the plurality of configurable input ports in accordance with the controller configuration, configure the plurality of configurable output ports in accordance with the controller configuration, and enable a set of control logic based on the controller configuration. The controller also includes an online control circuit configured to receive inputs via the plurality of configurable input ports, generate outputs based on the inputs and the set of control logic, and provide the outputs to building equipment via the plurality of configurable output ports.

19 Claims, 14 Drawing Sheets

(56) References Cited

U.S. PATENT DOCUMENTS

| | | | |
|---|---|---|---|
| 2012/0191258 A1* | 7/2012 | Amundson | F24F 11/30 700/278 |
| 2016/0154413 A1* | 6/2016 | Trivedi | F24F 11/62 700/276 |
| 2017/0045250 A1 | 2/2017 | Heigl et al. | |
| 2017/0292729 A1 | 10/2017 | Schuler et al. | |

* cited by examiner

| 2nd Fan Config | OA Flow Ctrl | Econo Type | In 1 | In 2 | In 3 | In 4 | In 5 | In 6 | Out 1 | Out 2 | Out 3 | Out 4 | Out 5 | Out 6 |
|---|---|---|---|---|---|---|---|---|---|---|---|---|---|---|
| No Fan | No | Dry bulb | Smoke Alarm | | | | | | SF-C | SF-O | Com Dmpr | | | |
| No Fan | No | H-switch | Smoke Alarm | | | H-switch | | | SF-C | SF-O | Com Dmpr | | | |
| No Fan | OAF | Dry bulb | Smoke Alarm | | | OAF | OAF | | SF-C | SF-O | Com Dmpr | | | |
| No Fan | OAF | H-switch | Smoke Alarm | | | H-switch | OAF | | SF-C | SF-O | Com Dmpr | | | |
| Vol Track | No | Dry bulb | Smoke Alarm | DAP | OAT | RA-F | DA-F | | SF-C | SF-O | RetF-C | RetF-O | RAD | EAD |
| Vol Track | No | H-switch | Smoke Alarm | DAP | OAT | H-switch | RA-F | DA-F | SF-C | SF-O | RetF-C | RetF-O | RAD | EAD |
| Vol Track | OAF | Dry bulb | Smoke Alarm | DAP | OAT | OAF | OAF | DA-F | SF-C | SF-O | RetF-C | RetF-O | RAD | EAD |
| Vol Track | OAF | H-switch | Not available | | | | | | | | | | | |
| Bld SP | No | Dry bulb | Smoke Alarm | DAP | OAT | Bld SP | | | SF-C | SF-O | RetF-C | RetF-O | RAD | EAD |
| Bld SP | No | H-switch | Smoke Alarm | DAP | OAT | Bld SP | H-switch | | SF-C | SF-O | RetF-C | RetF-O | RAD | EAD |
| Bld SP | OAF | Dry bulb | Smoke Alarm | DAP | OAT | Bld SP | OAF | OAF | SF-C | SF-O | RetF-C | RetF-O | RAD | EAD |
| Bld SP | OAF | H-switch | Smoke Alarm | DAP | OAT | Bld SP | H-switch | | SF-C | SF-O | RetF-C | RetF-O | RAD | EAD |
| Relief F | No | Dry bulb | Smoke Alarm | DAP | OAT | Bld SP | | | SF-C | SF-O | RlfF-C | RlfF-O | OAD | MAD |
| Relief F | No | H-switch | Smoke Alarm | DAP | OAT | Bld SP | H-switch | | SF-C | SF-O | RlfF-C | RlfF-O | OAD | MAD |
| Relief F | OAF | Dry bulb | Smoke Alarm | DAP | OAT | Bld SP | OAF | OAF | SF-C | SF-O | RlfF-C | RlfF-O | OAD | MAD |
| Relief F | OAF | H-switch | Smoke Alarm | DAP | OAT | Bld SP | H-switch | OAF | SF-C | SF-O | RlfF-C | RlfF-O | OAD | MAD |

FIG. 16

BUILDING EQUIPMENT CONTROLLER WITH USER-CONFIGUREABLE INPUTS AND OUTPUTS

BACKGROUND

The present disclosure relates to controllers for building equipment. Building equipment may include various chillers, boilers, air handling units, etc. which are operable to affect a variable state or condition of a building (e.g., indoor air temperature, humidity). Various building equipment can provide various data (e.g., temperature measurements, humidity measurements, air flow measurements). Building equipment may also be controllable by various control signals (e.g., specifying compressor frequencies, damper positions, valve positions, fan speeds, etc.) to operate in accordance with the control signals. Different control logic may be used to generate control signals based on the various data provided by the building equipment and the different controllable devices of the building equipment.

Because of this variety in possible inputs, outputs, control logic, etc. for various building equipment, it may be challenging and/or time consuming to select, install, and/or configure a controller to be compatible with a particular instance of building equipment. Additionally, when building equipment is modified (e.g., upgraded, partially damaged), it may be necessary to replace a controller to match the new requirements of the building equipment. An improved controller that overcomes these challenges is needed.

SUMMARY

One implementation of the present disclosure is a controller. The controller includes a plurality of configurable input ports, a plurality of configurable output ports, and a configuration circuit. The configuration circuit is configured to provide a graphical user interface configured to facilitate a user in inputting an equipment description, determine a controller configuration based on the equipment description, configure the plurality of configurable input ports in accordance with the controller configuration, configure the plurality of configurable output ports in accordance with the controller configuration, and enable a set of control logic based on the controller configuration. The controller also includes an online control circuit configured to receive inputs via the plurality of configurable input ports, generate outputs based on the inputs and the set of control logic, and provide the outputs to building equipment via the plurality of configurable output ports.

In some embodiments, the equipment description specifies components of the building equipment. The components include at least one of a sensor or a controllable device of the equipment.

In some embodiments, each configurable input port is switchable by the configuration circuit between a resistive-type input port, a current-type input port, a voltage-type input port, and a binary-type input port. In some embodiments, each configurable output port is switchable between a digital-type output port and an analog-type output port.

In some embodiments, the configuration circuit is configured to determine the controller configuration based on the equipment description by associating the equipment description with an identification code and accessing a look-up table. The look-up table designates the controller configuration for the identification code.

In some embodiments, the configuration circuit is configured to enable a set of control logic by selecting the set of control logic from a repository of possible control logic based on the identification code.

In some embodiments, the equipment description includes a visualization of the building equipment. In some embodiments, a network interface is configured to provide communication between the configuration circuit and a network. The configuration circuit is configured to provide the graphical user interface to a user interface device via the network.

Another implementation of the present disclosure is a method. The method includes receiving an equipment description from a user, determining a controller configuration based on the equipment description, configuring a configurable input port of a controller in accordance with the controller configuration, configuring a configurable output port of the controller in accordance with the controller configuration, enabling a set of control logic based on the controller configuration, receiving an input signal from building equipment at the configurable input port, generating a control signal based on the input and the set of control logic, and providing the control signal to the building equipment via the configurable output port.

In some embodiments, the method includes providing a graphical user interface configured to facilitate a user in inputting the equipment description. In some embodiments, the equipment description comprises a visualization of the building equipment. In some embodiments, the method includes providing the graphical user interface to a user device via a network. In some embodiments, the equipment description specifies components of the building equipment, the components comprising at least one of a sensor or a controllable device of the equipment.

In some embodiments, configuring the configurable input port of the controller in accordance with the controller configuration comprises switching the configurable input port to be one of a resistive-type input port, a current-type input port, a voltage-type input port, or a binary-type input port. In some embodiments, configuring the configurable output port of the controller in accordance with the controller configuration comprises switching the configurable input port to be one of a digital-type output port or an analog-type output port.

In some embodiments, determining the controller configuration based on the equipment description includes associating the equipment description with a descriptive code and accessing a look-up table. The look-up table designates the controller configuration for the descriptive code.

In some embodiments, enabling the set of control logic based on the controller configuration includes selecting the set of control logic from a repository of possible control logic based on the configuration descriptive code.

Another implementation of the present disclosure is a controller. The controller includes a first configurable input port, a second configurable input port, and a display configured to provide a graphical user interface. The graphical user interface facilitates a user in selecting input configurations for the first configurable input port and the second configurable input port. the controller also includes a configuration circuit configured to receive the input configurations, determine whether the input configurations set the first configurable input port and the second configurable input port to a same function, and, in response to a determination that the input configurations set the first configurable input port to the same function, configure the first configurable input port in accordance with the input configurations and ignore the input configurations for the second configurable input port.

In some embodiments, the configuration circuit is further configured to, in response to a determination that input configurations set the first configurable input port and the second configurable input port to different functions, configure the first configurable input port and the second configurable input port in accordance with the input configurations.

In some embodiments, the first configurable input port is configurable to receive a signal indicative of relative humidity, remote zone temperature, carbon dioxide, damper feedback, outdoor air temperature, or supply air temperature.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 16 is a table showing possible mappings of equipment descriptions to controller configurations, according to an exemplary embodiment.

DETAILED DESCRIPTION

Building HVAC Systems and Building Management Systems

Figure 1:
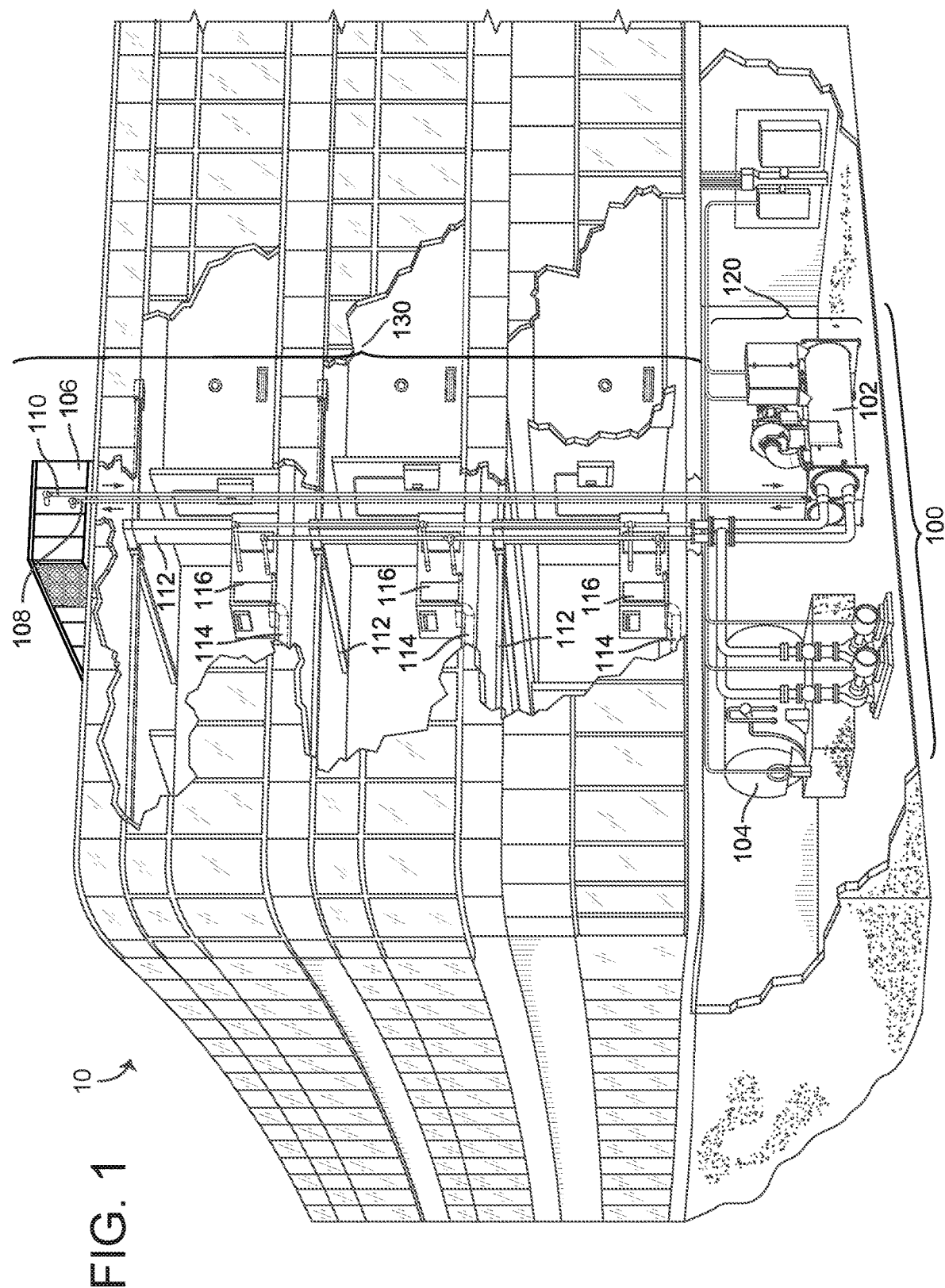
FIG. 1 is a drawing of a building equipped with a HVAC system, according to an exemplary embodiment.
Figure 2:
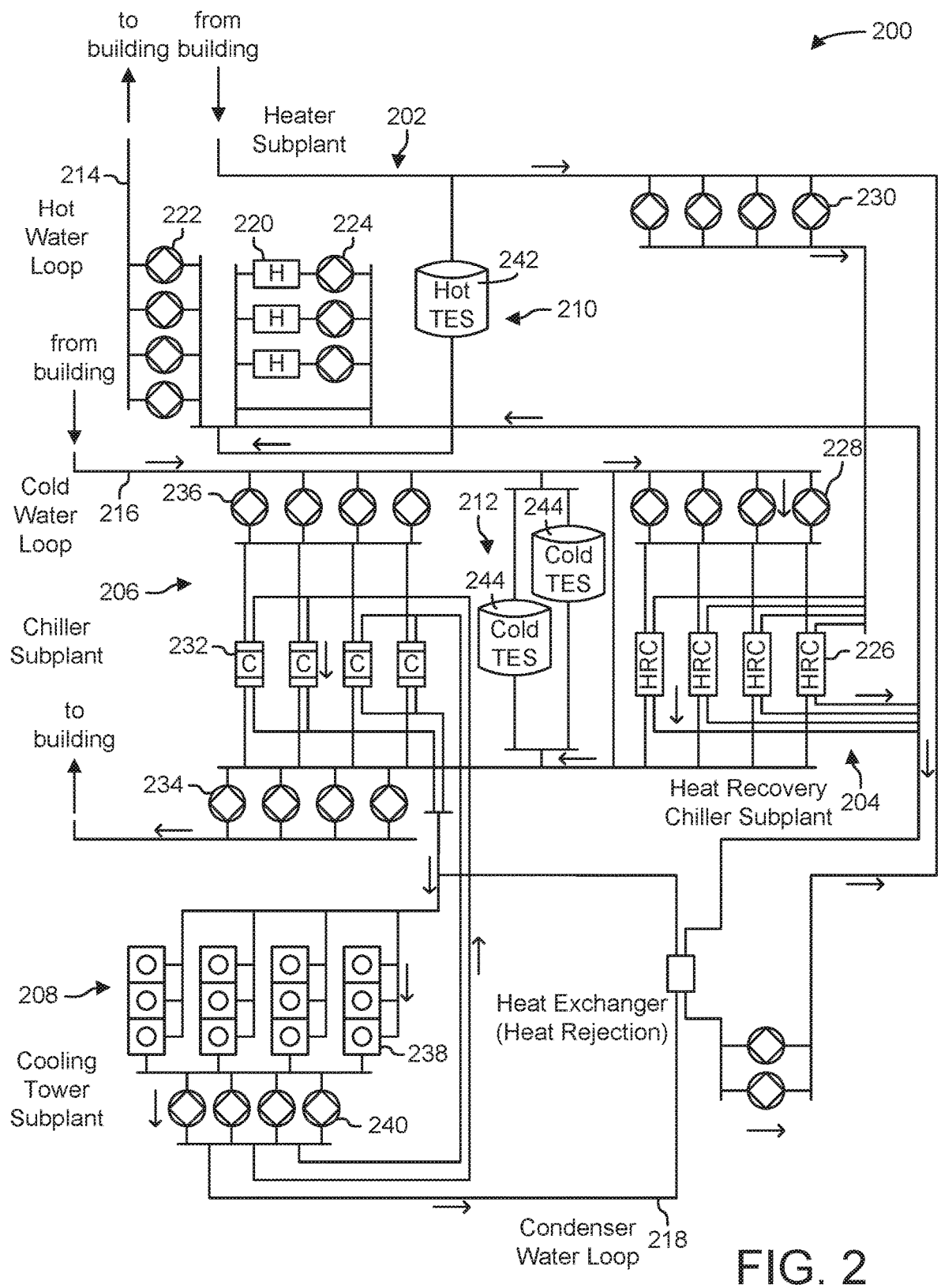
FIG. 2 is a block diagram of a waterside system which can be used to serve the building of FIG. 1, according to an exemplary embodiment.
Figure 3:
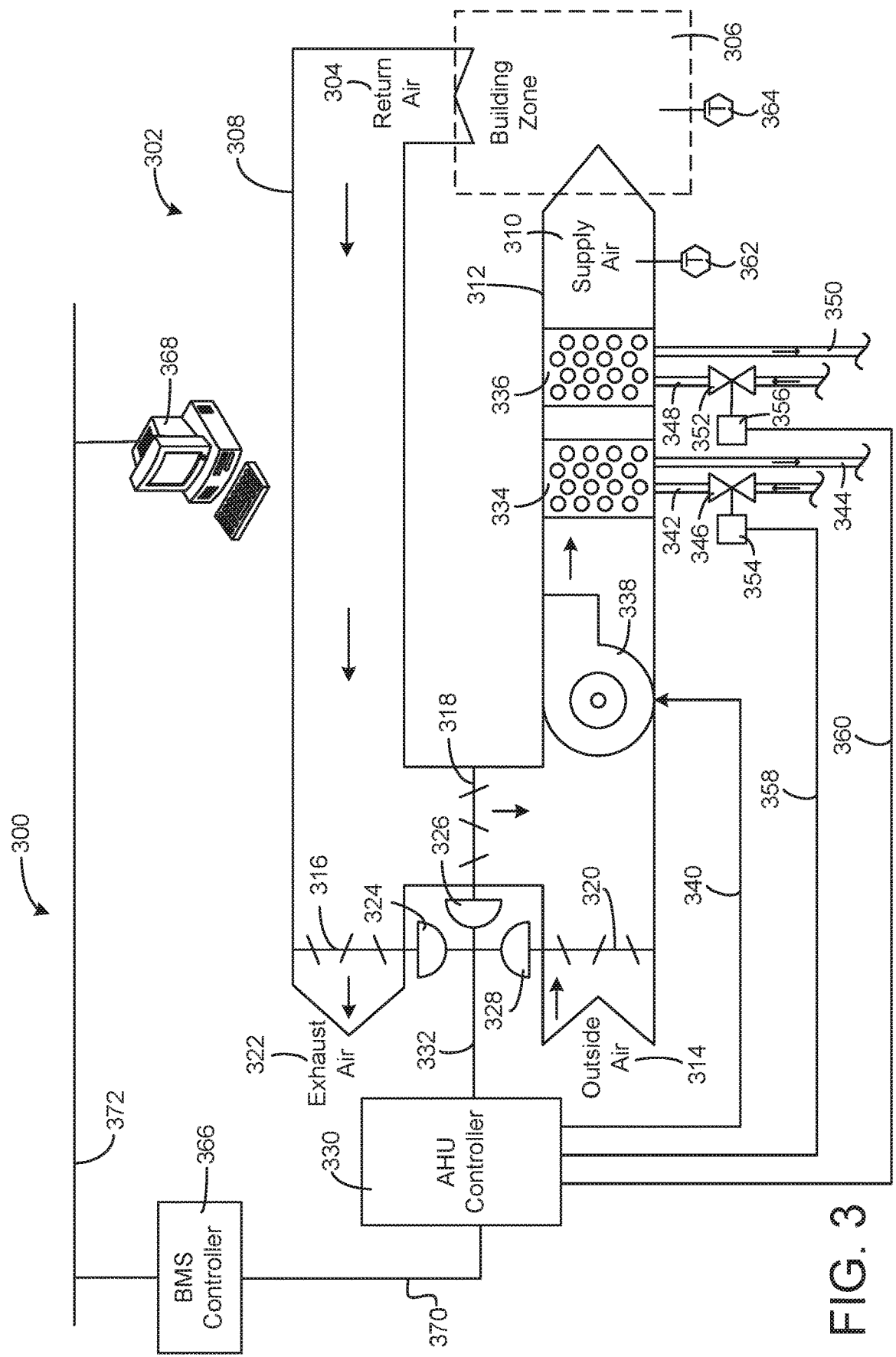
FIG. 3 is a block diagram of an airside system which can be used to serve the building of FIG. 1, according to an exemplary embodiment.
Figure 4:
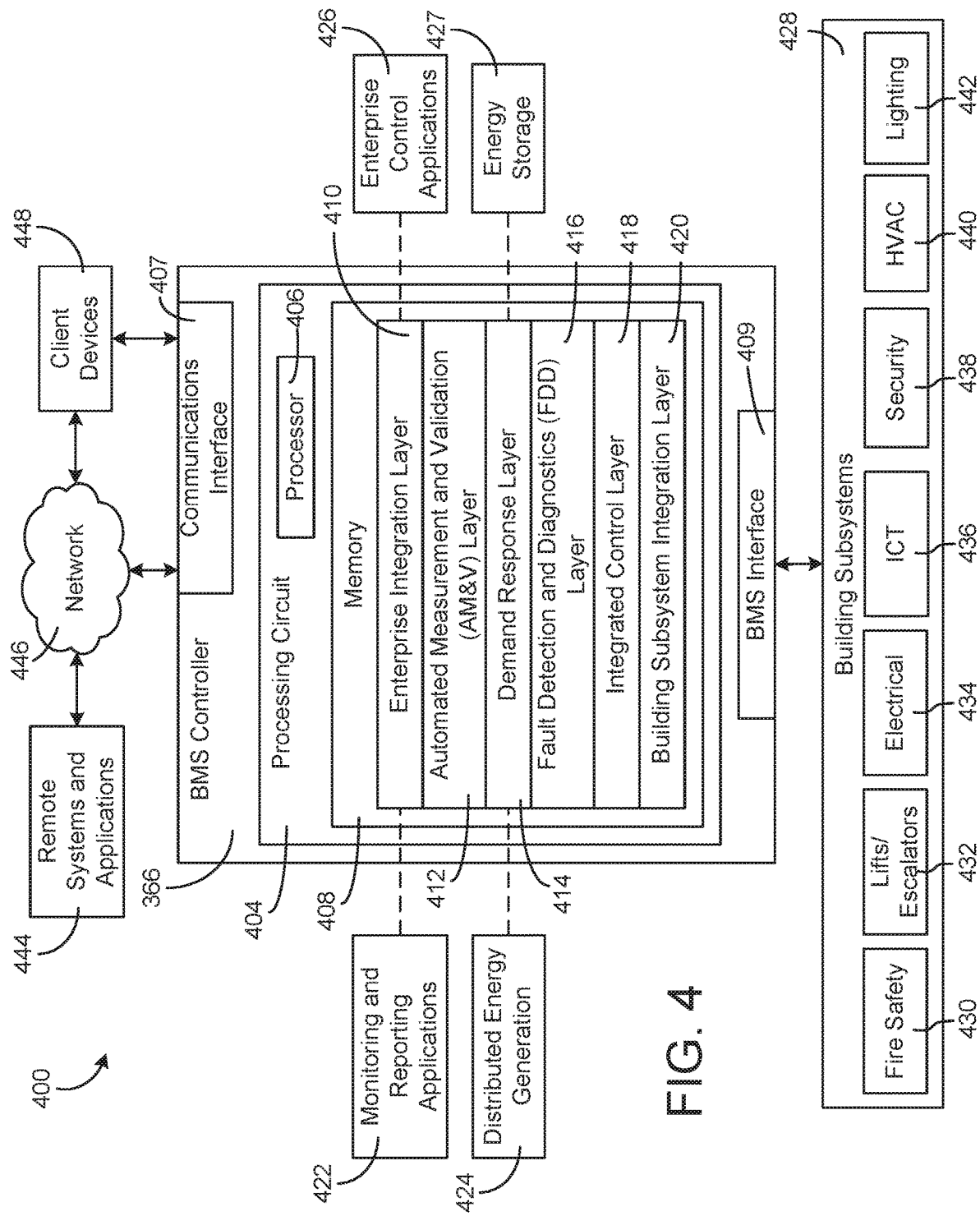
FIG. 4 is a block diagram of a building management system (BMS) which can be used to monitor and control the building of FIG. 1, according to an exemplary embodiment.
Figure 5:
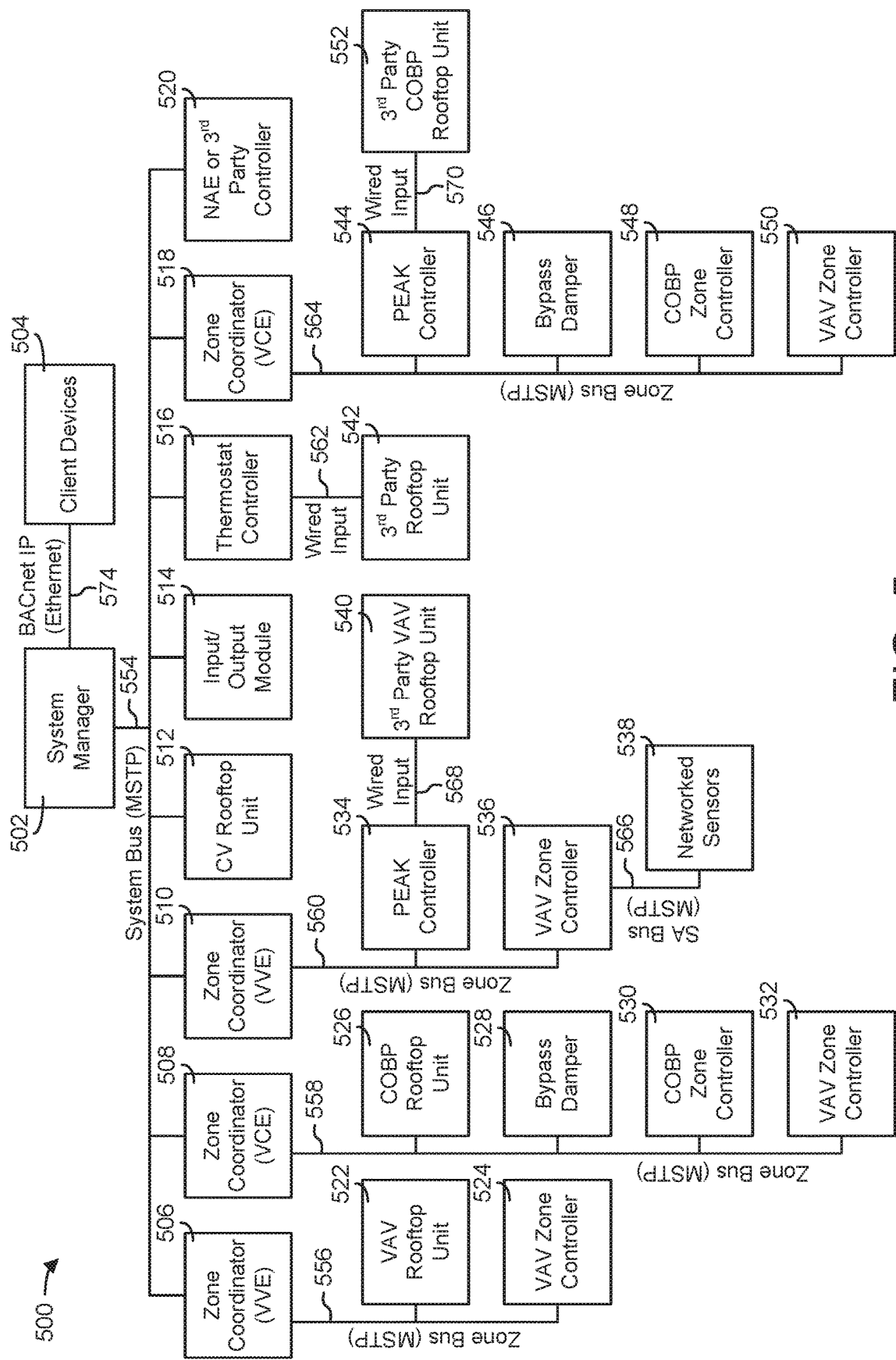
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

User-Configurable Controller

Referring now to FIGS. 6-15, systems and methods for user-configurable controllers are shown. As described in detail below, the user-configurable controllers and methods described herein provide for configuration of inputs, outputs, and/or control logic of a controller to make a controller compatible with a particular instance of building equipment. A user-friendly interface may be provided to facilitate a user in operating the user-configurable controller. Accordingly, such a controller may be easily and intuitively set-up and installed by a technician without significant expertise in controller configuration. Additionally, such a controller is adaptable to many variations in building equipment and thereby simplifies or eliminates challenges associated with selecting a controller for equipment at installation or replacing/altering a controller when building equipment is modified.

Figure 6:
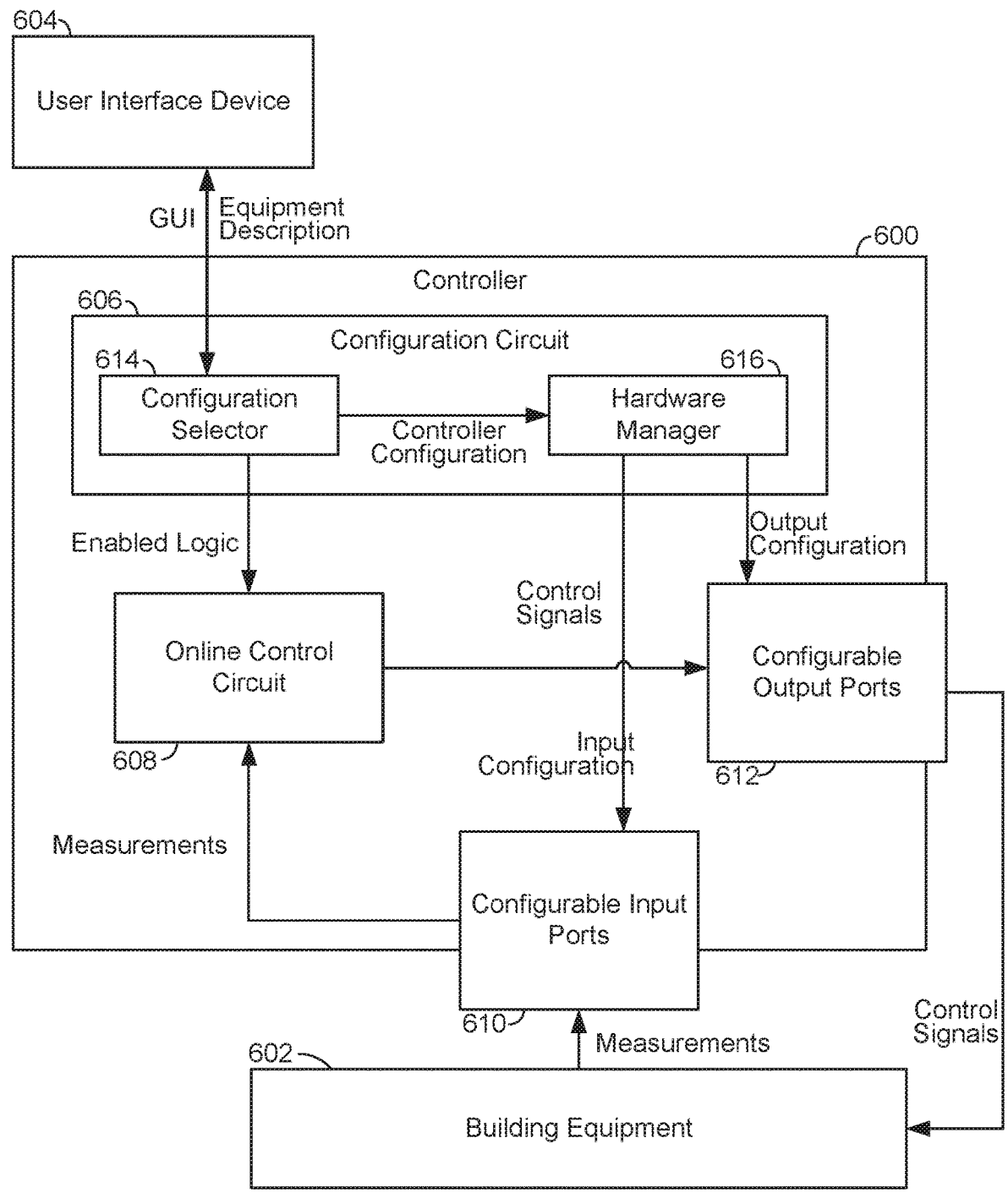
FIG. 6 is a block diagram of a user-configurable controller, according to an exemplary embodiment.

Referring now to FIG. 6, a block diagram of a controller 600 is shown, according to an exemplary embodiment. In some embodiments, the controller 600 may correspond to controllers 524, 532, 534, 536, 516, 548, or 550 of FIG. 5 and may be included in a BMS (e.g., BMS 500). In other embodiments, the controller 600 may operate independent of a BMS. As shown in FIG. 6, the controller 600 is communicably coupled to building equipment 602 and is configurable to control the building equipment 602 as described in detail below. The building equipment 602 may include an air handling unit, chiller, boiler, variable refrigerant flow system, etc., for example as shown in FIGS. 1-5 and described with reference thereto. It should be understood that a wide variety of types of building equipment 602 may be include. Additionally, even within one type of building equipment (e.g., air handling units), various features/devices/sensors may be included or not included with a particular instance of building equipment 602 (e.g., fans, dampers, flow stations, cooling/heating coils). As described below, the controller 600 is configurable to control any such instance of building equipment 602.

The controller 600 is also shown as communicably coupled to a user interface device 602. In some embodiments, the user interface device 602 is included as part of the controller 600. In such an embodiment, the controller 600 may include a display screen (e.g., a touchscreen) mounted on an exterior of the controller 600. In some embodiments, the user interface device 602 is separate from the controller 600 and communicable with the controller 600 via a network (e.g., WiFi, Bluetooth, the Internet, BACnet). In such an embodiment, the user interface device 604 may include a smartphone, tablet, laptop computer, desktop computer, etc.

As shown in FIG. 6, the controller 600 includes a configuration circuit 606, an online control circuit 608, configurable input ports 610, and configurable output ports 612, communicably and operably coupled to one another.

The configuration circuit 606 is configured to facilitate configuration of the online control circuit 608, the configurable input ports 610, and the configurable output ports 612. The configuration circuit 606 is shown to include a configuration selector 614 and a hardware manager 616. The configuration circuit 606 is shown in detail in FIG. 7 and described in detail with reference thereto below.

The online control circuit 608 is configured to receive inputs (e.g., sensor measurements) from the building equipment 602 via the configurable input ports 610, apply control logic to generate control signals for the building equipment 602 based on the inputs, and cause the control signals to be provided to the building equipment 602 via the configurable output ports 612. The online control circuit 608 thereby provides online (real-time) control of the building equipment 602.

The online control circuit 608 is configured to execute a variety of control algorithms, each of which may be compatible with one or more instances of building equipment 602. In a given scenario (e.g., for a given instance of building equipment 602), the online control circuit 608 is configurable by the configuration circuit 606 to apply a set of control logic which is compatible with (e.g., preferred for) that instance of building equipment 602. For example, in some embodiments the online control circuit 608 stores a repository of control logic and enables a set of control logic from the repository for online control in response to instructions from the configuration circuit 606. In other embodiments, the online control circuit 608 receives a set of enabled control logic from the configuration circuit 606 for use in online control.

The online control circuit 608 may thereby be configured to receive various inputs and provide various outputs as required to operate the building equipment 602 in various scenarios. In various scenarios and embodiments, the online control circuit 608 may provide proportional integral control, proportional integral derivative control, model predictive control, extremum-seeking control, self-optimizing control, and/or some other control approach suitable for controlling the building equipment 602.

The configurable input ports 610 facilitate the communication of information (e.g., sensor measurements) from the building equipment 602 to the controller 600 (e.g., to the online control circuit 608). In various embodiments, the configurable input ports 610 may include one or more (e.g., two, three, four, etc.) input ports 610, each of which is structured to receive one of a variety of points in one of a variety of formats from the building equipment 602 depending on a current configuration of the input port 610. The configuration circuit 606 (i.e., the hardware manager 616 as described below) configures each of the configurable input ports 610 to receive a particular point in a particular format in accordance with the points provided by the building equipment 602 (e.g., as indicated by a user). The configurable input ports 610 are thereby configurable (i.e., capable of being configured) to receive data for the points provided by a variety of building equipment 602.

For example, a configurable input port 610 may be configured to receive a temperature measurement, a humidity measurement, a damper position, or an air flow rate depending on the specification of the building equipment 602. Additionally, various sensors, etc. of the building equipment may require data to be read by the configurable input ports 610 in a variety of formats. Accordingly, a configurable input port 610 may be switchable between a resistive-type input port, a current-type input port, a voltage-type input port, and a binary-type input port. The configurable input port 610 may be configurable to receive analog or digital signals. Different parameters (e.g., voltage ranges, current ranges) may be used for different points, and the configurable input ports 610 may be adjusted accordingly. Various hardware implementations of the configurable input ports 610 suitable to providing such flexibility and configurability are contemplated by the present disclosure.

As shown in FIG. 6, the controller 600 also includes configurable output ports 612. Although both the output ports and the input ports are user-configurable in the example shown, in some embodiments only the output ports or only the input ports are user-configurable in the manner described herein.

The configurable output ports 612 facilitate the communication of information (e.g., control signals) from the controller 600 (e.g., from the online control circuit 608) to the building equipment 602.

In various embodiments, the configurable output ports 612 may include one or more (e.g., two, three, four, etc.) output ports 612, each of which is structured to provide one of a variety of points in one of a variety of formats to the building equipment 602 depending on a current configuration of the output port 612. The configuration circuit 606 (i.e., the hardware manager 616 as described below) configures each of the configurable output ports 612 to provide a particular point in a particular format in accordance with the specifications of the building equipment 602 (e.g., as indicated by a user). The configurable output ports 612 are thereby configurable (i.e., capable of being configured) to provide control signals to a variety of building equipment 602.

For example, a configurable output port 612 may be configured to provide a damper position, a fan speed, a compressor frequency, a temperature setpoint, etc., depending on the specification of the building equipment 602. Such outputs may be required to be provided in a variety of formats (e.g., analog voltage, digital) and parameters (e.g., maximum voltage) to be compatible with the building equipment 602. Accordingly, the configurable output ports 612 may be switchable between an analog-type output port and a digital-type output port and may be adaptable to match parameter requirements. Various hardware implementations of the configurable output ports 612 suitable to providing such flexibility and configurability are contemplated by the present disclosure.

Figure 7:
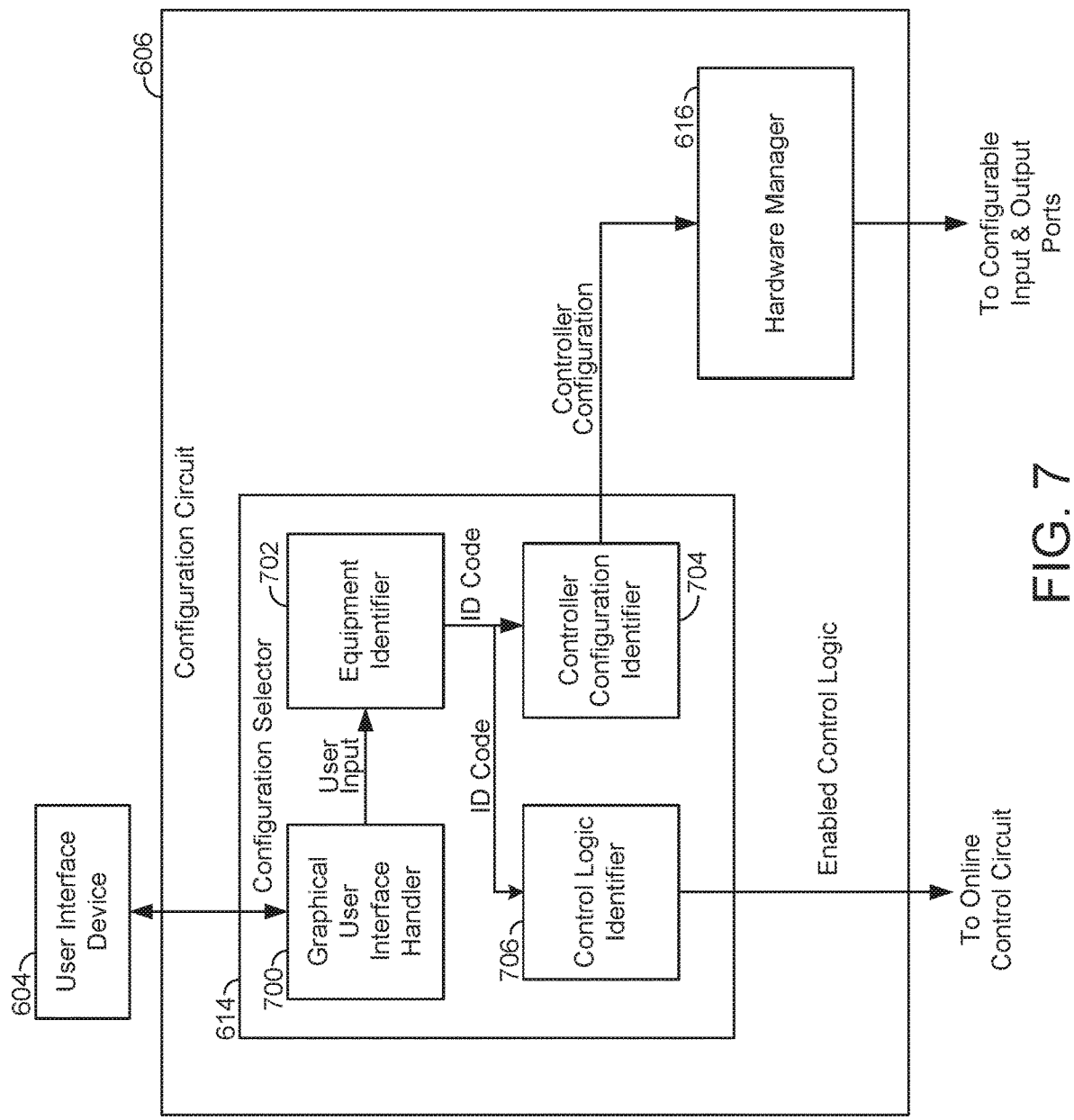
FIG. 7 is a detailed block diagram of a configuration circuit of the user-configurable controller, according to an exemplary embodiment.

Referring now to FIG. 7, a detailed view of the configuration circuit 606 is shown, according to an exemplary embodiment. In the example shown, the configuration circuit 606 is included locally at the controller 600. In alternative embodiments, the configuration circuit 606 may, in whole or in part, be located and operated remote from the controller 600. That is, some or all of the functions attributed herein to the configuration circuit 606 may be executed on one or more external computing devices (e.g., enterprise server, cloud service, personal computing device) communicable and operably coupled to the controller 600. It should be understood that many such implementations are possible within the scope of the present disclosure.

The configuration circuit 606 is shown to include a configuration selector 614 and a hardware manager 616. The configuration selector 614 is configured to select a controller configuration based on user input received from the user interface device 604, as described in detail below. As shown FIG. 7, the configuration selector includes a graphical user interface handler 700, an equipment identifier 702, a controller configuration identifier 704, and a control logic identifier 706.

The graphical user interface handler 700 can provide a graphical user interface to the user interface device 604 for display to a user. Examples of multiple views in an example graphical user interface are shown in FIGS. 11-15. For example, the graphical user handler may store pre-created graphical user interface views (e.g., the various views shown in FIGS. 11-15) and may provide a particular view in response to particular user input. The graphical user interface is configured to facilitate a user in inputting an equipment description, i.e., a description of the building equipment 602. For example, the equipment description input by the user may specify what types of sensors are included with the building equipment 602. As another example, the equipment description input by the user may specify the types of controllable devices (e.g., fans, dampers) included with the building equipment 602. In other embodiments, the user input may specify the type of input provided by the building equipment 602 to the controller 600, parameters of the input, etc. The equipment description may include a graphical representation of the building equipment 602 as in the examples of FIGS. 11-15.

The equipment description (i.e., the user input) received via the user interface device 604 is provided to the equipment identifier 702. The equipment identifier 702 translates the user-input equipment description into a corresponding identification code that can be used by the controller configuration identifier 704 and the control logic identifier 706. For example, in one example, each of multiple unique three-digit identification codes corresponds to a particular combination of possible features for an air handling unit (or other building equipment 602). The graphical user interface may be structured such that the user input is highly structured (i.e., based on drop down menus, check boxes, etc.), facilitating mapping of user input to an identification code. In other embodiments, the equipment identifier 702 may include natural language processing or machine-learning based functionality to process user input to determine an identification code based on unstructured user input.

As shown in FIG. 7, the equipment identifier 702 provides the identification code to the controller configuration identifier 704 and the control logic identifier 706. The controller configuration identifier 704 determines a controller configuration (i.e., settings and parameters for the configurable input ports 610 and the configurable output ports 612) based on the identification code. In some embodiments, the controller configuration identifier 704 stores a look-up table that designates a controller configuration for each of the possible identification codes. In such an embodiment, the controller configuration identifier 704 can look up the controller configuration using the identification code. In some embodiments, the look-up table is stored at a remote database accessible by the controller configuration identifier via a network. A controller configuration compatible with the building equipment 602 as described by the user via the user interface device 604 is thereby determined. The equipment identifier 702 provides the controller configuration to the hardware manager 616.

As shown in FIG. 7, the control logic identifier 706 receives the identification code from the equipment identifier 702. The control logic identifier 706 determines a set of control logic to enable based on the identification code. For example, in some embodiments, the control logic identifier 706 stores a repository of control logic that includes a set of control logic designated for each of the possible identification codes. In such an embodiment, the control logic identifier can select a set of control logic from the repository based on the identification code and provide the selected set of control logic to the online control circuit 608. In other embodiments, the online control circuit 608 stores (e.g., has pre-installed) the repository of control logic. In such a case, the control logic identifier may communicate with the online control circuit 608 to enable (activate, select) a particular set of control logic based on the identification code. In some embodiments, the repository of control logic is stored remotely from the control logic identifier and accessible by the control logic identifier 706 via a network.

In alternative embodiments, the control logic selector receives the controller configuration from the controller configuration identifier 704 and selects/enables a set of control logic for the online control circuit 608 based on the controller configuration. In any case, it should be understood that configuration circuit 606 enables control logic for the online control circuit 608 based on the user-input equipment description received via the user interface device 604.

The hardware manager 616 receives the controller configuration from the controller configuration identifier 704 and configures the configurable input ports 610 and configurable output ports 612 in accordance with the controller configuration. For example, in some embodiments, the hardware manager 616 is configured to control various switches or other hardware or software components within the configurable input ports 610 in order to set the type of each input port 610 (i.e., to establish an input port 610 as a resistive-type input port, a current-type input port, a voltage-type input port, or a binary-type input port). The hardware manager 616 may also be configured to control various switches or other hardware or software components within the configurable output ports 612 in order to set the type of each output port 612. The hardware manager 616 may also establish various other parameters and settings at the configurable input ports 610 and configurable output ports 612 in accordance with the controller configuration. In other words, the hardware manager 616 is capable of configuring the configurable input ports 610 and the configurable output ports 612 to be compatible with the equipment description of the building equipment 602 input by a user via the user interface device 604.

In some cases, the hardware manager 616 may determine that a reboot of the controller 600 is needed in order to complete configuration of the configurable input ports 610 and/or configurable output ports 612 in accordance with the controller configuration. In such a case, the hardware manager 616 may set a flag indicating that configuration shall be completed on reboot. On start-up of the controller 600 following a reboot, the flag is checked. In response to finding that the flag is set, the hardware manager 616 completes the planned configuration of the configurable input ports 610 and/or configurable output ports 612 in accordance with the controller configuration. The hardware manager 616 may then remove the flag.

The controller 600 may then be operated in an online control mode to control the building equipment 602. That is, the configurable input ports 610 receive data from the building equipment 602 in a format or format(s) compatible with a current configuration of the configurable input ports 610 (i.e., as configured by the hardware manager 616). The online control circuit 608 processes the data using the set of control logic enabled by the control logic identifier 706 to generate control signals compatible with the building equipment 602. The configurable output ports 612, as configured by the hardware manager 616, facilitate transmission of the control signals to the building equipment 602. In other words, the controller 600 is automatically configured for online control of the building equipment 602 based on an equipment description input by a user via the user interface device 604.

In some embodiments, the controller 600 is communicable with a remote database or server that provides updates to the controller 600 via network. For example, the look-up table and repository of control logic described above may be updated with data received from the remote database or server. The abilities of the controller 600 may thereby be extended or otherwise altered over time. In some embodiments, the controller 600 is configured to query the remote database or server in a scenario where an internally-stored look-up table or repository of control logic fails to yield a controller configuration or set of control logic. The remote database or server may be configured to provide or generate a controller configuration or set of control logic in such a scenario to avoid failure of a controller configuration process. It should be understood that various updates locally at the controller 600 or on a remote server, remote database, cloud-computing resource, etc. may be used to expand or modify the capabilities (e.g., the available controller configurations and control logic) during the life cycle of the controller 600.

Figure 8:
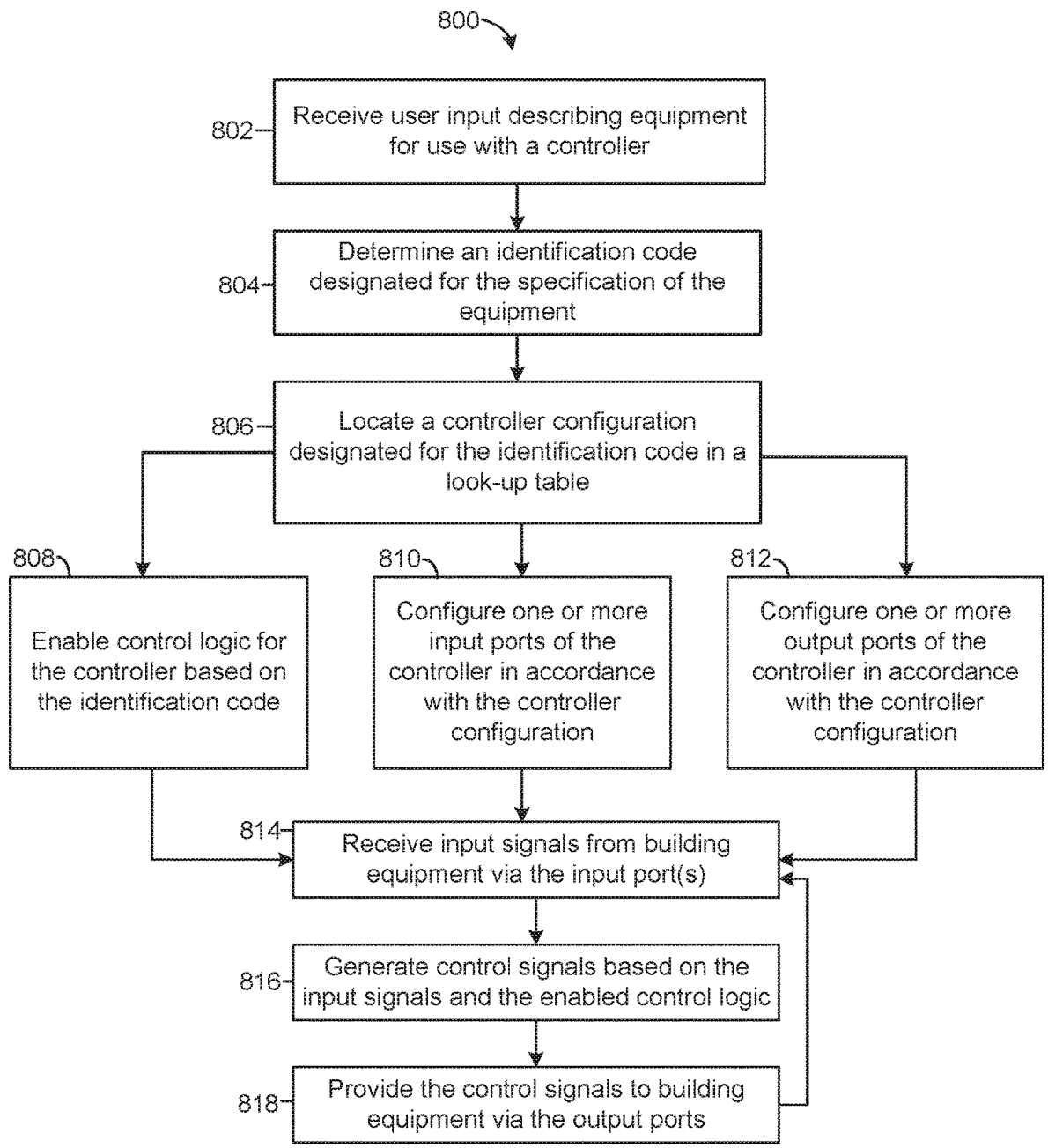
FIG. 8 is a flowchart of a first process for controller configuration, according to an exemplary embodiment.

Referring now to FIG. 8, a flowchart of a process 800 for controller configuration is shown, according to an exemplary embodiment. The process 800 may be executed by the controller 600. It should be understood that various other implementations of the process 800 are also possible.

At step 802, user input describing equipment for use with a controller is received (e.g., controller 600). For example, an equipment description or specification may be received. For example, the user input may specify a set of features, devices, components, sensors, etc. included with the building equipment (e.g., building equipment 602). In some cases, the user input may identify a model number, manufacturer, or other information relating to the building equipment or components, etc. thereof. The user input may be received via a graphical user interface. In some cases, security credentials for the user may be checked and authorization for the user to configure the controller approved before the user input is received. At step 804, an identification code designated for the received equipment description is determined.

At step 806, a controller configuration designated for the identification code is located in a look-up table. The look-up table may be pre-populated and may store a mapping of each identification code to one controller configuration of multiple possible controller configurations. Each controller configuration specifies configuration information for input and/or output ports of the controller, for example relating to a port type (resistive type, voltage type, digital or binary type, etc.), parameters for the input and/or output port, etc. The identification code is used to locate the controller configuration compatible with the equipment described by the user input.

At step 808, control logic for the controller is enabled based on the identification code. For example, a repository of control logic may be stored by a controller or in a remote database accessible by a controller via a network. A look-up table or other mapping may be used to identify a set of control logic from the repository of control logic that is preferred for (designated for) any given identification code. The control logic may then be installed, selected, enabled, etc. on the controller for use in online control.

At step 810, one or more input ports (e.g., configurable input ports 610) are configured in accordance with the controller configuration located at step 806. Various physical and/or software changes to the one or more input ports may be made to achieve the controller configuration, depending on the implementation of the input ports.

At step 812, one or more output ports (e.g., configurable output ports 612) are configured in accordance with the controller configuration located at step 806. Various physical and/or software changes to the one or more output ports may be made to achieve the controller configuration, depending on the implementation of the output ports.

The controller (e.g., controller 600) is thereby configured for online control compatible with the building equipment described by the user input received at step 802. An instruction manual may be included to provide instructions relating to which input ports and output ports should be connected to which components of the building equipment for each of various equipment descriptions. In some embodiments, a graphical user interface is provided to the user that provides instructions on installing (e.g., wiring) the controller for use with the building equipment.

At step 814, the controller receives input signals from the building equipment (e.g., building equipment 602). The input signals may include various sensor measurements or other information generated by the building equipment, for example temperature measurements, damper positions, air flow measurements, humidity measurements, etc. At step 816, control signals are generated based on the input signals and the enabled control logic. For example, a proportional-integral control logic, proportional-integral-derivative control logic, extremum-seeking control logic, self-optimizing control logic, model predictive control logic, or some other control logic may be executed. At step 818, the control signals generated at step 816 are provided to the building equipment via the output ports. The building equipment may then operate in accordance with the control signals. Steps 814-818 may be repeated cyclically to provide a control loop that controls the building equipment.

Figure 9:
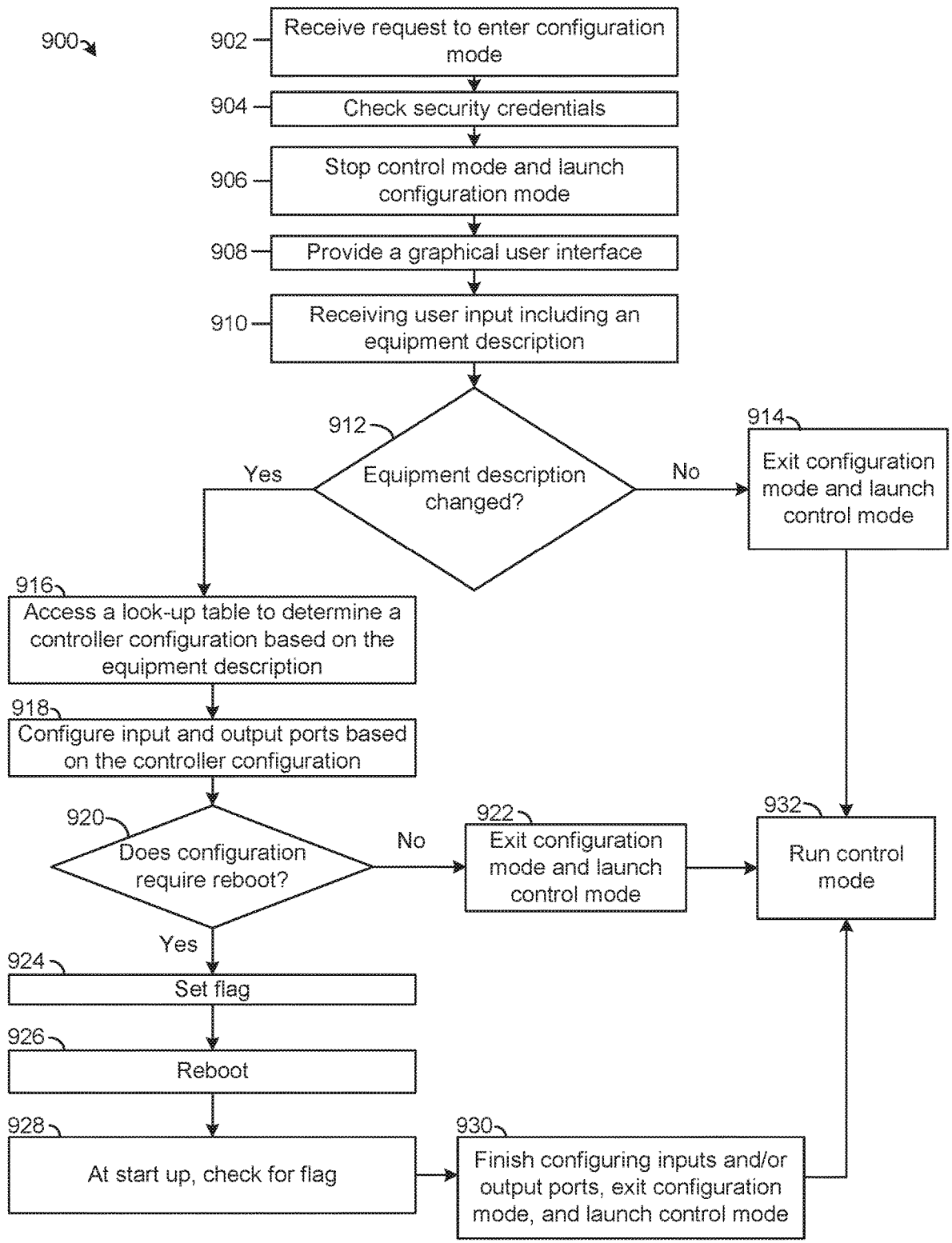
FIG. 9 is a flowchart of a second process for controller configuration, according to an exemplary embodiment.

Referring now to FIG. 9, a flowchart of a process 900 for updating the configuration of a controller is shown, according to an exemplary embodiment. The process 900 may be executed by the controller 600. It should be understood that various additional implementations of the process 900 are possible.

At step 902, a request is received at a controller (e.g., controller 600) to enter a configuration mode. For example, the request may be received from a user via user interface device 604. At step 904, security credentials associated with the request are checked. For example, a user may be prompted to input a password to the user interface device 604 and user input may be checked against a preset password. The controller may communicate with a system manager or other component of a BMS to facilitate the checking of security credentials. If the security credentials indicate that the user is authorized to modify a configuration of the controller (e.g., if the password entered by a user matches the preset password), at step 906 a control mode of the controller is stopped and the configuration mode is launched.

At step 908, a graphical user interface is provided to a user, for example via user interface device 604 as described above. The graphical user interface may prompt a user to input an equipment description that describes the building equipment that the user desires the controller to be configured to control. For example, as shown in FIGS. 11-15 and described in detail with reference thereto, the graphical user interface may include drop down menus and graphical representations of the building equipment and components thereof to facilitate a user in selecting an equipment configuration. At step 910, user input is received that includes the equipment description.

At step 912, a determination is made regarding whether the equipment description input by the user has changed relative to (i.e., is different than) a current equipment description. For example, the configuration circuit 606 may store a current equipment description corresponding to an existing/current configuration of the controller 600 for comparison to the equipment description input received at step 910. If the equipment description did not change, no reconfiguration of the controller is needed and the process 900 proceeds to step 914 where the configuration mode is exited and an online control mode is launched (e.g., resumed).

If the equipment description changed relative to a current (pre-existing) equipment description, the process 900 proceeds to step 916 where a look-up table is accessed to determine a controller configuration based on the equipment description. For example, the equipment description may be associated with an identification number which corresponds to an entry in the look-up table that includes the controller configuration. The controller configuration may be read, copied, etc. from the look-up table.

At step 918, input and/or output ports of the controller are configured based on the controller configuration. For example, various switches or other mechanisms or circuits may be used to provide input and output types and parameters as required by the controller configuration.

At step 920, a determination is made regarding whether a reboot is required to complete the configuration of the controller. For example, some changes to an input or output port may require the controller to reboot for the configuration change to be successfully activated. If no reboot is required, the process 900 proceeds to step 922 where the configuration mode is exited and the control mode is launched.

If reboot is determined to be required at step 920, at step 924 a flag is set indicating that configuration of inputs and/or outputs needs to be completed after reboot. At step 926, the controller is rebooted. The controller may be automatically reset as part of process 900 or the process 900 may wait until the controller is rebooted independently (e.g., on demand from a user, according to a schedule). At step 928, during start-up of the controller, the controller checks for the flag. In response to finding the flag, at step 930 the configuration of the input is completed, the configuration mode is exited, and the control mode is launched.

Following the launch of the control mode (i.e., following steps 914, 922, or 930), the control mode is run 932. That is, at step 932, the controller provides an online control loop to control the building equipment. The process 900 thereby allows for online modification of the configuration of inputs and outputs to compensate for adjustments to the building equipment as input by a user. In alternative embodiments, the controller 600 monitors the building equipment to detect changes in the building equipment (e.g., failure of a component) and can trigger initiation of process 900 starting at step 912 automatically.

Figure 10:
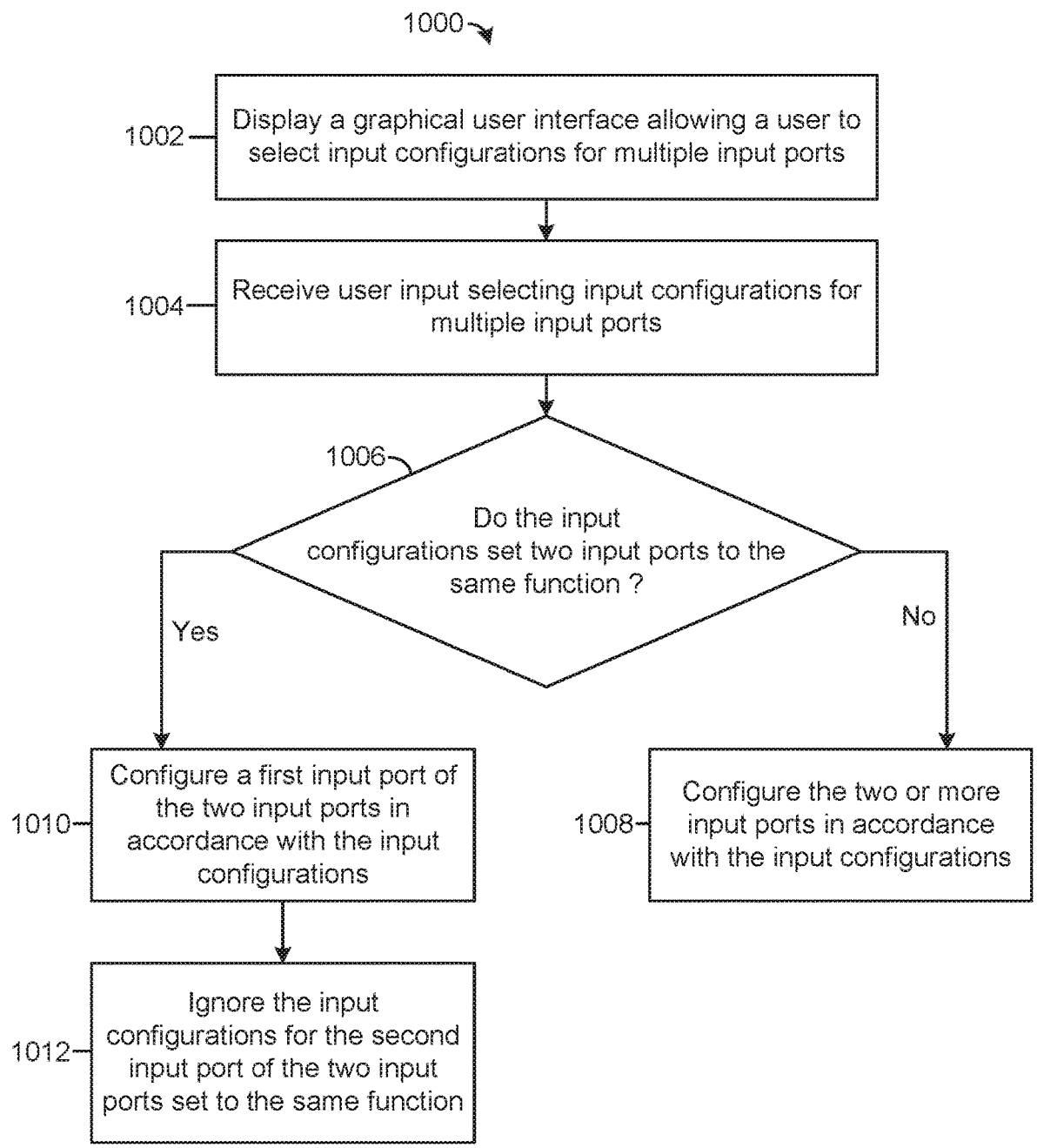
FIG. 10 is a flowchart of a third process for controller configuration, according to an exemplary embodiment.

Referring now to FIG. 10, a flowchart of a process 1000 for configuring input ports is shown, according to an exemplary embodiment. Process 1000 can be carried out by controller 600 of FIG. 6. In preferred embodiments, process 1000 is carried out by a controller having two or more (e.g., three) configurable input ports. Although the embodiment of process 1000 shown in FIG. 10 refers only to input ports, it should be understood that another embodiment of process 1000 may also or alternatively handle configuration of output ports.

At step 1002, a graphical user interface is displayed which allows a user to selecting input configurations for multiple input ports (e.g., for two input ports). For example, the graphical user interface may be displayed on a user interface device 604. The graphical user interface can provide selectable options, input fields, etc. that allow a user to specify a type of data to be received at an input port (e.g., outside air temperature, indoor air temperature, relative humidity, air flow rate), parameters for the input, and/or other configuration settings. In some embodiments, security credentials for the user are checked before the user interface is displayed. At step 1004, user input is received via the graphical user interface that selects input configurations for multiple input ports.

At step 1006, a determination is made regarding whether the input configurations input by the user sets two input ports to the same function. For example, if two input ports are set to receive outdoor air temperature, it is determined that the input configurations set two input ports to the same function. In response to a determination that the input configurations set the multiple input ports to different functions, all of the multiple input ports are configured in accordance with the input configurations at step 1008.

In response to a determination that the input configurations set two input ports to the same function, at step 1010 a first input port of the two input ports set to the same function is selected and configured in accordance with the input configurations (i.e., to facilitate or provide the function). At step 1012, the input configurations for the second of the two input ports are ignored, i.e., such that duplicative configuration is avoided. Process 1000 is thereby an efficient process that avoids unnecessary reconfiguration of input ports.

Referring now to FIGS. 11-15, various views in a graphical user interface 1100 provided by the controller 600 and displayed on the user interface device 604 of FIG. 6 are shown, according to exemplary embodiments. In the examples shown, the user interface device 604 is a touchscreen device, and the building equipment 602 is an air handling unit. It should be understood that the graphical user interface 1100 is shown for example purposes and that various graphical user interfaces compatible with the controllers and methods described herein are possible.

Figure 11:
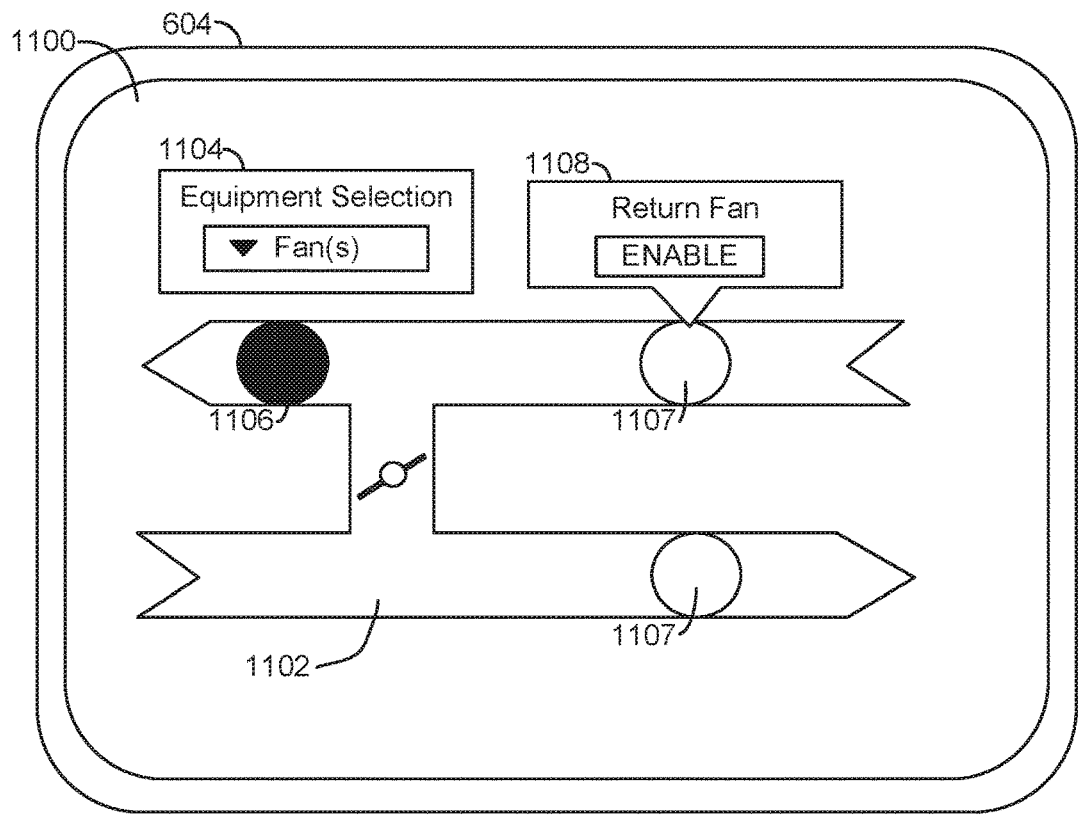
FIG. 11 is a depiction of a first view in a graphical user interface provided by the user-configurable controller, according to an exemplary embodiment.

As shown in FIG. 11, the graphical user interface 1100 shows an illustration of an air handling unit 1102, an equipment selection box 1104, and an enable dialog box

1106. The equipment selection box 1104 includes a drop down menu that allows a user to select a type of component of the air handling unit 1102 that the user wishes to describe (e.g., add, remove, modify) for the air handling unit 1102. As shown, "Fan(s)" is selected. Accordingly, fan icons are shown that are selectable to add or remove a fan. More particularly, in the example shown, the shaded fan icon 1106 represents where a fan can be added while the white fan icons 1107. Although shown and described as "shaded" and "white", it should be understood that any coloring, fill pattern, shading, etc. may be used to distinguish between icons. As shown, one of the white fan icons 1107 has been selected by a user (e.g., touched, tapped by the user). In response, the enable dialog box 1108 is presented on the graphical user interface. The enable dialog box allows a user to input whether or not the building equipment 602 includes a component (e.g., a return fan) corresponding to the white fan icon 1107 selected by the user. The user is thereby facilitated in inputting structured information describing the inclusion of various fans in the building equipment 602. In some embodiments, the enable dialog box 1108 allows a user to input various other information, parameters, etc. relating to the corresponding component of the building equipment 602.

Figure 12:
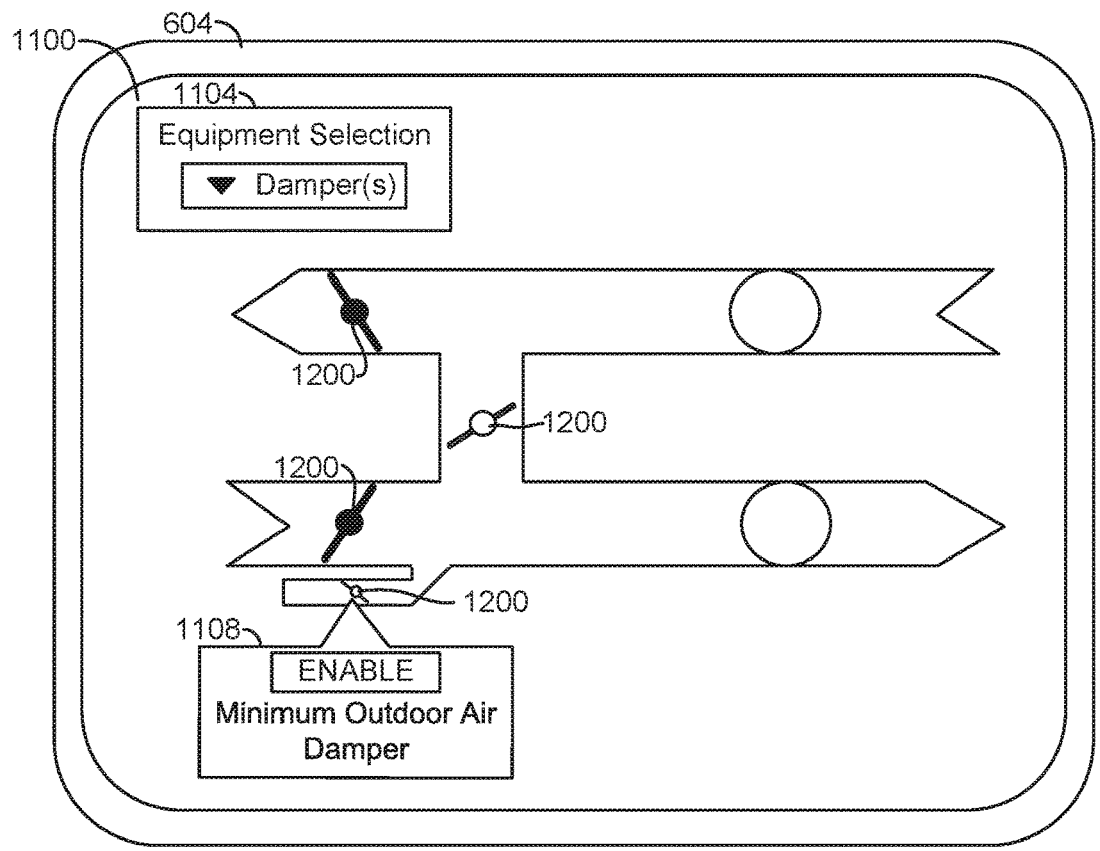
FIG. 12 is a depiction of a second view in a graphical user interface provided by the user-configurable controller, according to an exemplary embodiment.

As shown in FIG. 12, the equipment type "damper(s)" is selected in the equipment selection box 1104. Accordingly, various damper icons 1200 are shown that can be selectively enabled or disabled via the graphical user interface 1100 to add or remove the corresponding damper from the equipment description as visualized on the graphical user interface 1100. For example, FIG. 12 shows an enable dialog box 1108 for a minimum outdoor air damper which allows a user to enable or disable a minimum outdoor air damper of air handling unit 1102 to match the actual components and specification of the real-world building equipment 602.

Figure 13:
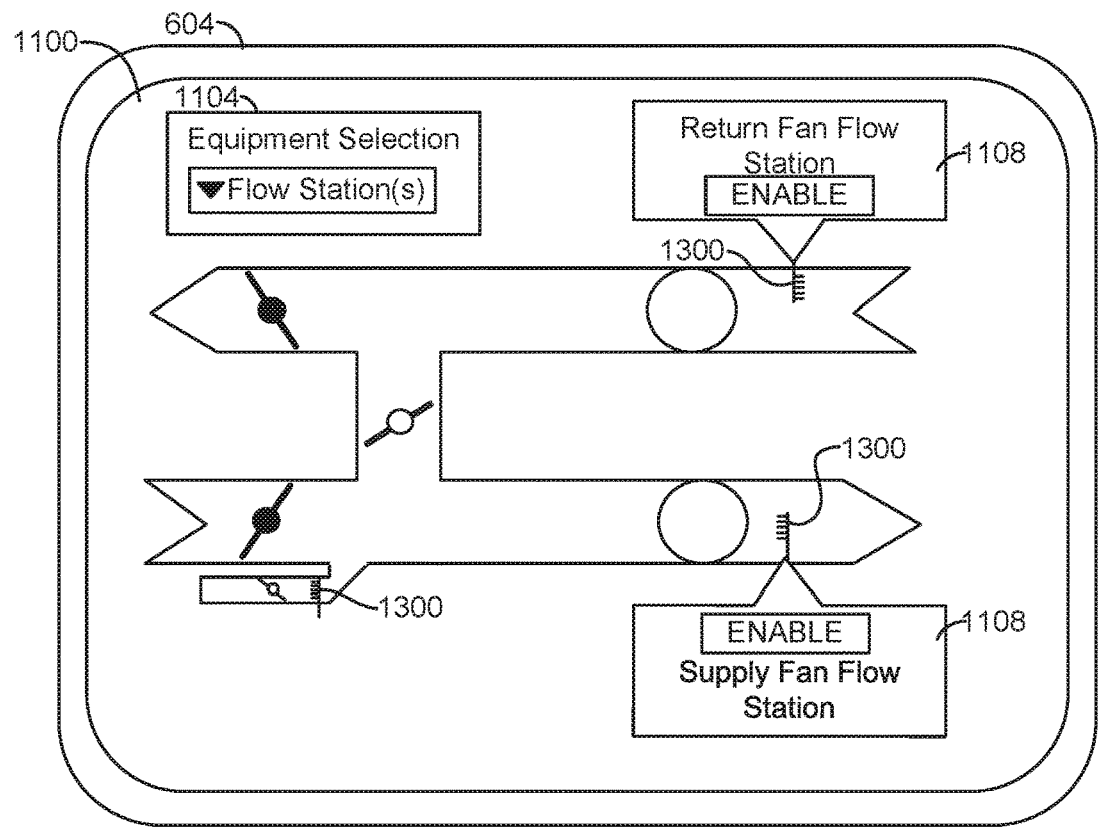
FIG. 13 is a depiction of a third view in a graphical user interface provided by the user-configurable controller, according to an exemplary embodiment.

As shown in FIG. 13, the equipment type "flow station(s)" is selected in the equipment selection box 1104. Accordingly, various flow station icons 1300 are shown that can be selectively enabled or disabled via the graphical user interface 1100 to add or remove the corresponding flow station from the equipment description as visualized on the graphical user interface 1100. For example, FIG. 13 shows an enable dialog box 1108 for a return fan flow station and an enable dialog box 1108 for a supply fan flow station, which allow the user to enable or disable the corresponding fan flow stations of the air handling unit 1102 to match the actual components and specification of the real-world building equipment 602.

Figure 14:
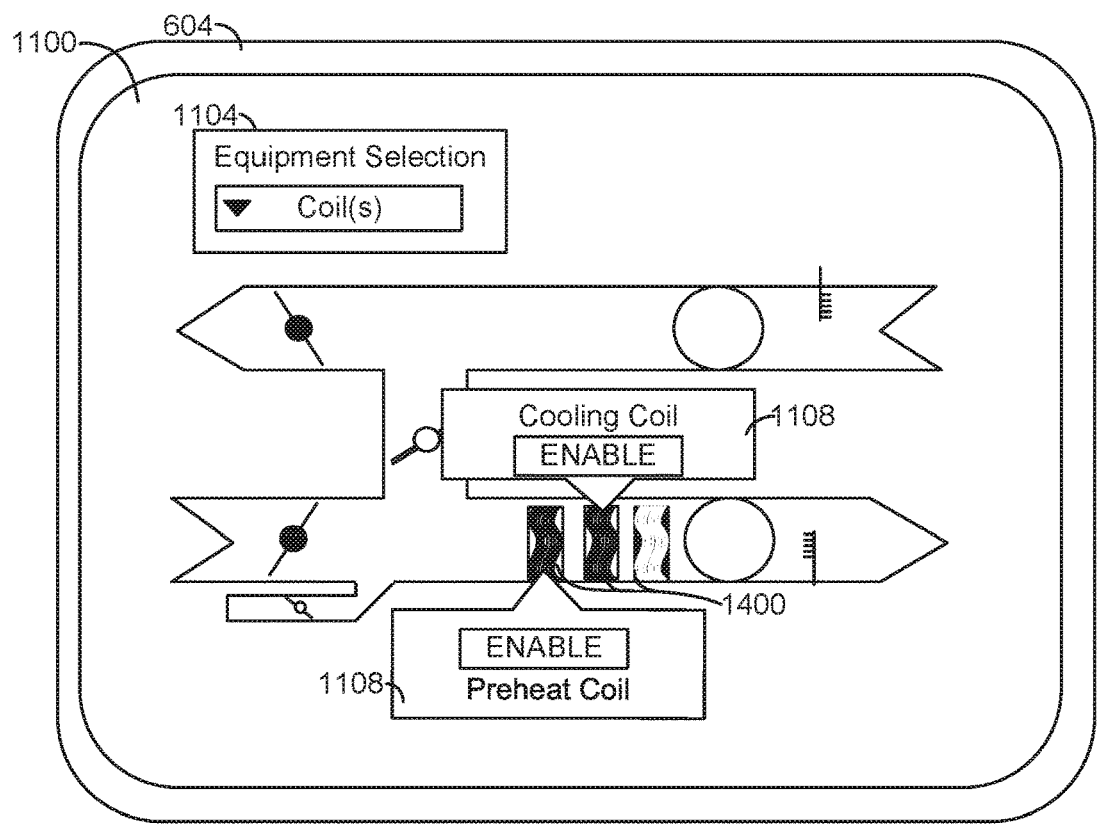
FIG. 14 is a depiction of a fourth view in a graphical user interface provided by the user-configurable controller, according to an exemplary embodiment.

As shown in FIG. 14, the equipment type "Coil(s)" is selected in the equipment selection box 1104. Accordingly, various coil icons 1400 are shown that can be selectively enabled or disabled via the graphical user interface 1100 to add or remove the corresponding coil from the equipment description as visualized on the graphical user interface 1100. For example, FIG. 14 shows an enable dialog box 1108 for a cooling coil and an enable dialog box 1108 for a preheat coil, which allow the user to enable or disable the corresponding coils of the air handling unit 1102 to match the actual components and specification of the real-world building equipment 602.

Figure 15:
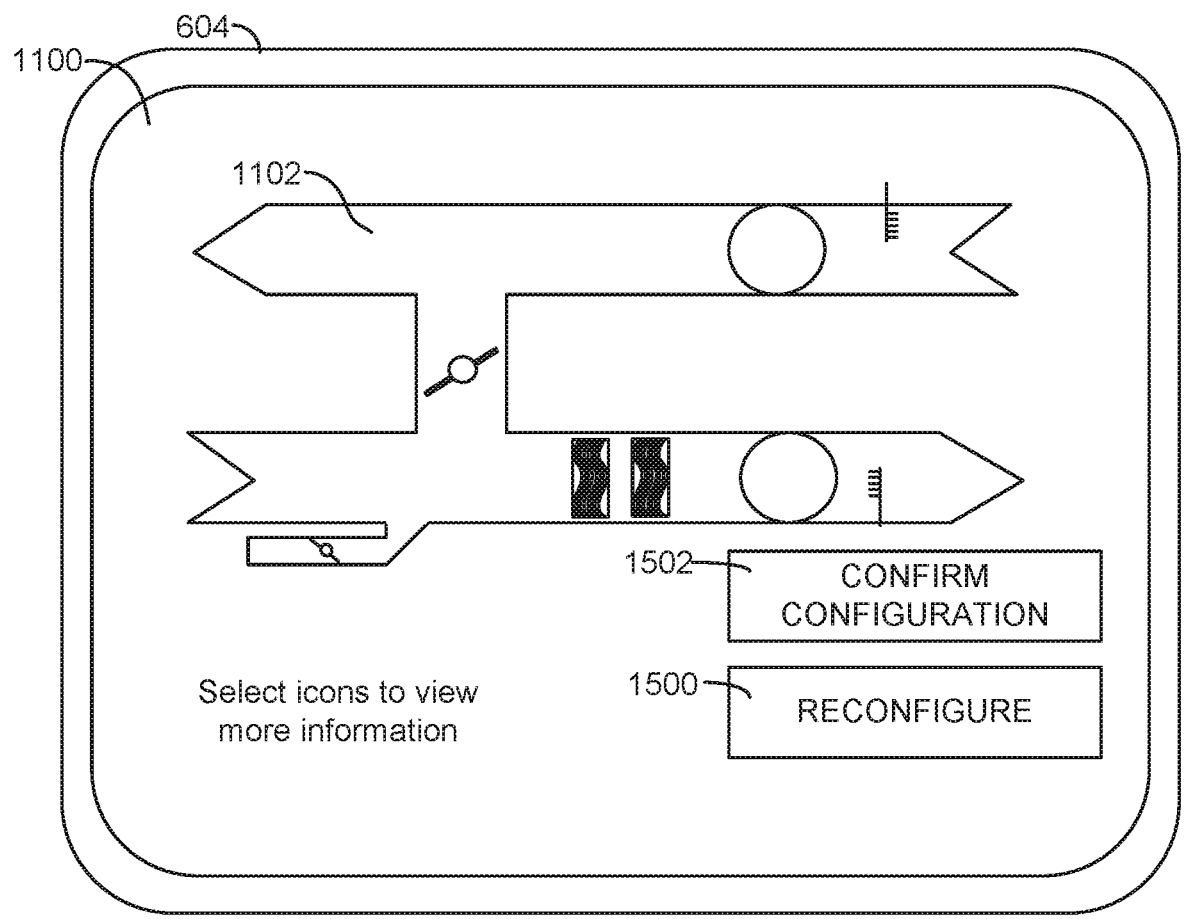
FIG. 15 is a depiction of a fifth view in a graphical user interface provided by the user-configurable controller, according to an exemplary embodiment.

By allowing the user to select the various equipment types and enabling/disabling various components of the air handling unit 1102 as shown in FIGS. 11-14, the graphical user interface 1100 provided by the controller 600 allows the user to input an equipment description for the air handling unit 1102 (i.e., for the building equipment 602). As shown in FIG. 15, the graphical user interface 1100 visualizes the equipment description, specifying the various fans, dampers, flow stations, and coils included in the air handling unit 1102. A reconfigure button 1500 is included and may be selected by a user to modify the equipment description using the views shown in FIGS. 11-14. A confirm configuration button 1502 is selectable by the user to confirm the equipment description and initiate configuration of the controller 600 (i.e., configuration of the configurable inputs 610, the configurable outputs 612, and the online control circuit 608). The systems and methods described herein thereby provide a user with a user-friendly and intuitive workflow for configuration the controller 600.

Referring now to FIG. 16, a table showing possible mappings of equipment description to controller configurations is shown. For example, the table of FIG. 16 may represent part of a look-up table as used at step 916 of process 900 or step 806 of process 800. The three left-most columns address aspects of the equipment description, while the remaining columns each correspond to a configurable input port 610 or a configurable output port 612. It should be understood that additional detail (parameters, port type, etc.) may also be included in a look-up table to characterize the controller configuration, although not shown in FIG. 16 for the sake ease of presentation. Additionally, it should be understood that the table of FIG. 16 is included as an illustration and should not be considered as limiting. Many other mappings of equipment descriptions to controller configurations are possible.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A controller comprising:
    a plurality of configurable input ports;
    a plurality of configurable output ports;
    a configuration circuit configured to:
        provide a graphical user interface configured to facilitate a user in inputting an equipment description;
        determine a controller configuration based on the equipment description;
        configure the plurality of configurable input ports in accordance with the controller configuration;
        configure the plurality of configurable output ports in accordance with the controller configuration; and
        enable a set of control logic based on the controller configuration; and
    an online control circuit configured to receive inputs via the plurality of configurable input ports, generate outputs based on the inputs and the set of control logic, and provide the outputs to building equipment via the plurality of configurable output ports; and
    wherein each configurable output port is switchable between a digital-type output port and an analog-type output port.

2. The controller of claim 1, wherein the equipment description specifies components of the building equipment, the components comprising at least one of a sensor or a controllable device of the building equipment.

3. The controller of claim 1, wherein each configurable input port is configurable to receive a signal indicative of at least one of relative humidity, remote zone temperature, carbon dioxide, damper feedback, outdoor air temperature, or supply air temperature.

4. A controller comprising:
    a plurality of configurable input ports;
    a plurality of configurable output ports;
    a configuration circuit configured to:
        provide a graphical user interface configured to facilitate a user in inputting an equipment description;
        determine a controller configuration based on the equipment description;
        configure the plurality of configurable input ports in accordance with the controller configuration;
        configure the plurality of configurable output ports in accordance with the controller configuration; and
        enable a set of control logic based on the controller configuration; and
    an online control circuit configured to receive inputs via the plurality of configurable input ports, generate outputs based on the inputs and the set of control logic, and provide the outputs to building equipment via the plurality of configurable output ports; and
    wherein each configurable input port is switchable by the configuration circuit between a resistive-type input port, a current-type input port, a voltage-type input port, and a binary-type input port.

5. The controller of claim 4, wherein each configurable output port is switchable between a digital-type output port and an analog-type output port.

6. A controller comprising:
a plurality of configurable input ports;
a plurality of configurable output ports;
a configuration circuit configured to:
provide a graphical user interface configured to facilitate a user in inputting an equipment description;
determine a controller configuration based on the equipment description;
configure the plurality of configurable input ports in accordance with the controller configuration;
configure the plurality of configurable output ports in accordance with the controller configuration; and
enable a set of control logic based on the controller configuration; and
an online control circuit configured to receive inputs via the plurality of configurable input ports, generate outputs based on the inputs and the set of control logic, and provide the outputs to building equipment via the plurality of configurable output ports; and
wherein the configuration circuit is configured to determine the controller configuration based on the equipment description by:
associating the equipment description with an identification code;
accessing a look-up table, the look-up table designating the controller configuration for the identification code.

7. The controller of claim 6, wherein the configuration circuit is configured to enable a selected set of control logic by selecting the set of control logic from a repository of possible control logic based on the identification code.

8. A controller comprising:
a plurality of configurable input ports;
a plurality of configurable output ports;
a configuration circuit configured to:
provide a graphical user interface configured to facilitate a user in inputting an equipment description;
determine a controller configuration based on the equipment description;
configure the plurality of configurable input ports in accordance with the controller configuration;
configure the plurality of configurable output ports in accordance with the controller configuration; and
enable a set of control logic based on the controller configuration; and
an online control circuit configured to receive inputs via the plurality of configurable input ports, generate outputs based on the inputs and the set of control logic, and provide the outputs to building equipment via the plurality of configurable output ports; and
wherein the equipment description comprises a visualization of the building equipment.

9. The controller of claim 1, comprising a network interface configured to provide communication between the configuration circuit and a network; and
wherein the configuration circuit is configured to provide the graphical user interface to a user interface device via the network.

10. A method comprising:
receiving an equipment description from a user;
determining a controller configuration based on the equipment description;
configuring a configurable input port of a controller in accordance with the controller configuration;
configuring a configurable output port of the controller in accordance with the controller configuration;
enabling a set of control logic based on the controller configuration;
receiving an input signal from building equipment at the configurable input port;
generating a control signal based on the input signal and the set of control logic; and
providing the control signal to the building equipment via the configurable output port; and
wherein the equipment description comprises a visualization of the building equipment.

11. The method of claim 10, comprising providing a graphical user interface configured to facilitate the user in inputting the equipment description.

12. The method of claim 11, comprising providing the graphical user interface to a user device via a network.

13. The method of claim 10, wherein the equipment description specifies components of the building equipment, the components comprising at least one of a sensor or a controllable device of the building equipment.

14. A method comprising:
receiving an equipment description from a user;
determining a controller configuration based on the equipment description;
configuring a configurable input port of a controller in accordance with the controller configuration;
configuring a configurable output port of the controller in accordance with the controller configuration;
enabling a set of control logic based on the controller configuration;
receiving an input signal from building equipment at the configurable input port;
generating a control signal based on the input signal and the set of control logic; and
providing the control signal to the building equipment via the configurable output port; and
wherein configuring the configurable input port of the controller in accordance with the controller configuration comprises switching the configurable input port to be one of a resistive-type input port, a current-type input port, a voltage-type input port, or a binary-type input port.

15. A method comprising:
receiving an equipment description from a user;
determining a controller configuration based on the equipment description;
configuring a configurable input port of a controller in accordance with the controller configuration;
configuring a configurable output port of the controller in accordance with the controller configuration;
enabling a set of control logic based on the controller configuration;
receiving an input signal from building equipment at the configurable input port;
generating a control signal based on the input signal and the set of control logic; and
providing the control signal to the building equipment via the configurable output port; and
wherein configuring the configurable output port of the controller in accordance with the controller configuration comprises switching the configurable ouutput port to be one of a digital-type output port or an analog-type output port.

16. The method of claim 15, wherein the equipment description comprises a visualization of the building equipment.

17. A method comprising:
receiving an equipment description from a user;
determining a controller configuration based on the equipment description;
configuring a configurable input port of a controller in accordance with the controller configuration;
configuring a configurable output port of the controller in accordance with the controller configuration;
enabling a set of control logic based on the controller configuration;
receiving an input signal from building equipment at the configurable input port;
generating a control signal based on the input signal and the set of control logic; and
providing the control signal to the building equipment via the configurable output port; and
wherein determining the controller configuration based on the equipment description comprises:
associating the equipment description with a descriptive code;
accessing a look-up table, the look-up table designating the controller configuration for the descriptive code.

18. The method of claim 17, wherein enabling the set of control logic based on the controller configuration comprises selecting the set of control logic from a repository of possible control logic based on the descriptive code.

19. A controller comprising:
a plurality of configurable input ports;
a plurality of configurable output ports;
a configuration circuit configured to:
provide a graphical user interface configured to facilitate a user in inputting an equipment description;
determine a controller configuration based on the equipment description;
configure the plurality of configurable input ports in accordance with the controller configuration;
configure the plurality of configurable output ports in accordance with the controller configuration; and
enable a set of control logic based on the controller configuration; and
an online control circuit configured to receive inputs via the plurality of configurable input ports, generate outputs based on the inputs and the set of control logic, and provide the outputs to building equipment via the plurality of configurable output ports; and
a network interface configured to provide communication between the configuration circuit and a network; and
wherein the configuration circuit is configured to receive updates from a remote database communicably connected to the network, and wherein the configuration circuit is further configured to query the remote database via the network for the set of control logic where an internally-stored repository of control logic fails to yield the set of control logic required for the controller configuration.

* * * * *